United States Patent
Lee et al.

(10) Patent No.: US 10,440,262 B2
(45) Date of Patent: Oct. 8, 2019

(54) ELECTRONIC DEVICE AND METHOD FOR PROCESSING IMAGE

(71) Applicant: Samsung Electronics Co., Ltd., Suwon-si, Gyeonggi-do (KR)

(72) Inventors: Woo-Yong Lee, Hwaseong-si (KR); Seung-Woo Lee, Yongin-si (KR); Hyoung-Sun Ji, Suwon-si (KR); Pyo-Jae Kim, Hwaseong-si (KR); Gyu-Bong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/119,964

(22) PCT Filed: Jan. 13, 2015

(86) PCT No.: PCT/KR2015/000320
§ 371 (c)(1),
(2) Date: Aug. 18, 2016

(87) PCT Pub. No.: WO2015/126060
PCT Pub. Date: Aug. 27, 2015

(65) Prior Publication Data
US 2017/0064199 A1    Mar. 2, 2017

(30) Foreign Application Priority Data

Feb. 21, 2014 (KR) .................. 10-2014-0020474

(51) Int. Cl.
*H04N 5/232* (2006.01)
*H04N 5/235* (2006.01)
*G06K 9/00* (2006.01)

(52) U.S. Cl.
CPC ..... *H04N 5/23222* (2013.01); *G06K 9/00221* (2013.01); *H04N 5/2356* (2013.01); *H04N 5/23219* (2013.01); *H04N 5/23229* (2013.01)

(58) Field of Classification Search
CPC .......... H04N 5/23222; H04N 5/23219; H04N 5/23229; G06K 9/00221

USPC ........... 348/207.11, 345–349; 382/276, 282, 382/298, 299, 297, 286
See application file for complete search history.

(56) References Cited

U.S. PATENT DOCUMENTS

| | | | | |
|---|---|---|---|---|
| 8,767,085 | B2 * | 7/2014 | Park .................. | H04N 5/23212 348/222.1 |
| 9,288,377 | B2 * | 3/2016 | Peng ..................... | H04N 5/232 348/345 |
| 2006/0045381 | A1 | 3/2006 | Matsuo et al. | |
| 2006/0232682 | A1 * | 10/2006 | Ono ....................... | H04N 5/228 348/222.1 |
| 2008/0259176 | A1 * | 10/2008 | Tamaru ................. | H04N 5/228 348/222.1 |

(Continued)

FOREIGN PATENT DOCUMENTS

| | | |
|---|---|---|
| CN | 101742107 A | 6/2010 |
| CN | 102648624 A | 8/2012 |

(Continued)

OTHER PUBLICATIONS

Nikon, "Predictive Focus Tracking System", http://www.nikon.com/about/technology/software/caf/index.htm, pp. 1-3, Mar. 2008.

(Continued)

*Primary Examiner* — Marly S Camargo
(74) *Attorney, Agent, or Firm* — Jefferson IP Law, LLP

(57) ABSTRACT

An electronic device and a method for processing an image are disclosed, and according to various examples, an operation of the electronic device can include an operation controlling a computation module so as to identify a subject from image data and calculating photography parameters on the basis of the identified subject, and an operation providing the calculated photography parameters to a camera module through a control module prior to a photographing command of a user, and other examples can be carried out.

13 Claims, 7 Drawing Sheets

(56) References Cited

U.S. PATENT DOCUMENTS

| | | |
|---|---|---|
| 2009/0268080 A1 | 10/2009 | Song et al. |
| 2010/0128163 A1 | 5/2010 | Nagasaka et al. |
| 2011/0273471 A1* | 11/2011 | Nagasaka ................ G06T 5/00 345/619 |
| 2012/0237193 A1 | 9/2012 | Kawarada |
| 2012/0327293 A1 | 12/2012 | Ollila et al. |
| 2013/0063645 A1 | 3/2013 | Aoyama |
| 2014/0334683 A1 | 11/2014 | Masuda |
| 2014/0354781 A1* | 12/2014 | Matsuyama ....... H04N 5/23212 348/49 |
| 2015/0130986 A1 | 5/2015 | Ohnishi |
| 2019/0139239 A1* | 5/2019 | Yasutomi ................ G06T 7/337 382/294 |

FOREIGN PATENT DOCUMENTS

| | | |
|---|---|---|
| JP | 2012-189934 A | 10/2012 |
| JP | 2013-58958 A | 3/2013 |
| KR | 10-2009-0113076 A | 10/2009 |
| WO | 2013/161944 A1 | 10/2013 |
| WO | 2013/088917 A1 | 4/2015 |

OTHER PUBLICATIONS

Kwanghyun Lee & Sanhoon Lee, "Advanced Auto-Focus and Auto-Exposure Algorithm Detecting Object for Video", Yonsei University, p. 147-150, Feb. 2008.
Office Action dated Sep. 7, 2018, issued in the Chinese application No. 201580009627.6.
Notice of Acceptance dated Oct. 15, 2018, issued in the Australian application No. 2015219766.
Chinese Office Action dated Mar. 28, 2019, issued in a counterpart Chinese application No. 201580009627.6.
Chinese Office Action with English translation dated Jul. 29, 2019; Chinese Appln. No. 201580009627.6.

* cited by examiner

ELECTRONIC DEVICE AND METHOD FOR PROCESSING IMAGE

TECHNICAL FIELD

Various embodiments relate to an electronic device, and specifically relate to a device and a method for processing an image.

BACKGROUND ART

In recent years, a growing number of electronic devices perform one or more functions in combination. The majority of such electronic devices are mobile terminals that are generally so-called smartphones. A mobile terminal: has a large touch-screen display module; is capable of playing multimedia content, such as music and video, in addition to the basic function of reciprocal communication; and enables web surfing through access to a network. In addition, the electronic device has a high-resolution camera module and, thus, is capable of taking a still image or video.

The electronic device may provide various services using images acquired with a camera. For example, the electronic device may focus on a subject included in an image and blur the background, thereby taking the image with the subject emphasized.

DETAILED DESCRIPTION OF THE INVENTION

Technical Problem

According to a conventional art, the electronic device may acquire a plurality of images with a changing focus. For example, the electronic device may provide an AF bracketing function.

In this case, after moving a lens to focus on a main subject and taking a picture, the electronic device moves the lens to focus on another subject and waits to detect a photographing command, resulting in a longer photographing time.

According to various embodiments of the present disclosure, an electronic device may provide a device and a method for providing a photography parameter to a camera module before a photographing command is detected. For example, the electronic device may calculate, as a photography parameter, at least one or more of the position of a moving lens, the number of exposure times of a sensor, exposure time of the sensor, the photoelectric efficiency of the sensor, the brightness of a flash, and light emitting time of the flash, and may provide the photography parameter to the camera module.

Technical Solution

To solve the foregoing problem or other problems, a method according to one embodiment may include an operation of controlling a computation module to identify a subject from image data and calculating a photography parameter on the basis of the identified subject, and may also include an operation of providing the calculated photography parameter to a camera module through a control module prior to a photographing command from a user.

Advantageous Effects

An image processing method and device of an electronic device, according to various embodiments of the present disclosure, may provide a photography parameter to a camera module prior to a photographing command from a user according to one embodiment, thus omitting an operation of providing a photography parameter whenever a photographing command is given.

MODE FOR CARRYING OUT THE INVENTION

Figure 1:
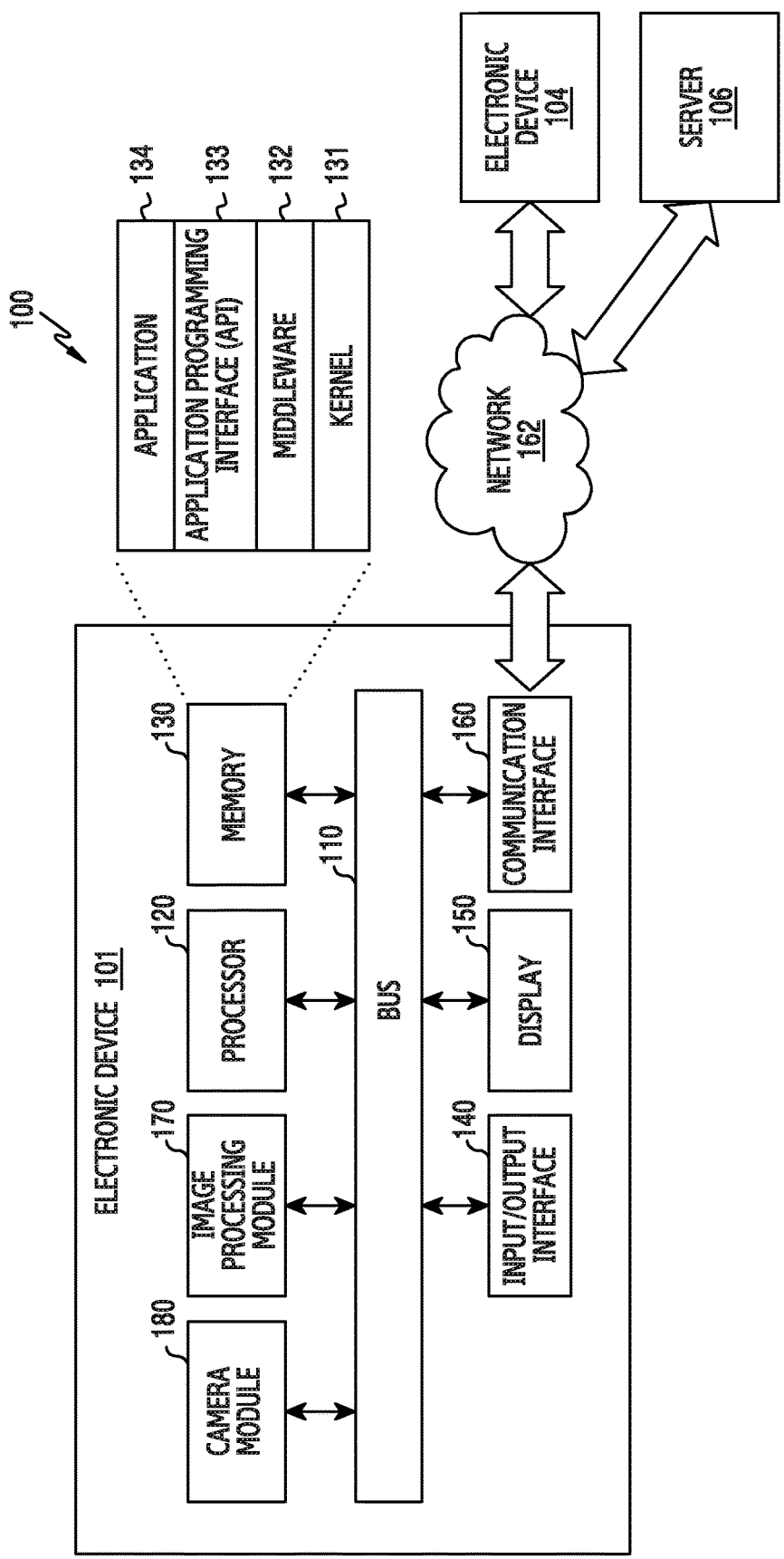
FIG. 1 illustrates a network environment 100 including an electronic device 101 according to various embodiments.

Hereinafter, the present disclosure will be described with reference to the accompanying drawings. The present disclosure may have various modifications and embodiments and thus will be described in detail with reference to specific embodiments illustrated in the drawings. However, it should be understood that there is no intent to limit the present disclosure to the particular forms disclosed herein; rather, the present disclosure should be construed to cover all modifications, equivalents, and/or alternatives falling within the spirit and scope of the disclosure. In connection with descriptions of the drawings, like reference numerals designate like elements.

In the present disclosure, the expression "include" or "may include" refers to existence of a corresponding function, operation, or element, and does not limit one or more additional functions, operations, or elements. In the present disclosure, the terms such as "include" and/or "have" may be construed to denote a certain characteristic, number, step, operation, constituent element, element or a combination thereof, but may not be construed to exclude the existence of or a possibility of addition of one or more other characteristics, numbers, steps, operations, constituent elements, elements or combinations thereof.

In the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present disclosure.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed therebetween.

The terms used in the present disclosure are only used to describe specific embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to some embodiments, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to some embodiments, the electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function. The electronic device according to the present disclosure may be a combination of one or more of the aforementioned various devices. Further, it is obvious to those skilled in the art that the electronic device according to the present disclosure is not limited to the aforementioned devices.

Hereinafter, an electronic device according to various embodiments will be described with reference to the accompanying drawings. The term "user" used in various embodiments may refer to a person who uses an electronic device or a device (for example, an artificial intelligence electronic device) that uses an electronic device.

FIG. 1 illustrates a network environment 100 including an electronic device 101 according to various embodiments. Referring to FIG. 1, the electronic device 101 may include a bus 110, a processor 120, a memory 130, an input/output interface 140, a display 150, a communication interface 160, and an image processing module 170.

The bus 110 may be a circuit that connects the foregoing components to each other and delivers communications (for example, control messages) between the foregoing components.

The processor 120 may receive a command through, for example, the bus 110 from the foregoing other components (for example, the memory 130, the input/output interface 140, the display 150, the communication interface 160, or the image processing module 170), may decode the received command, and may perform an operation or data processing according to the decoded command.

The memory 130 may store a command or data received from the processor 120 or other components (for example, the input/output interface 140, the display 150, the communication interface 160, or the image processing module 170) or generated by the processor 120 or other components. The memory 130 may include programming modules, for example, a kernel 131, middleware 132, an application programming interface (API) 133, an application 134, or the like. Each of the foregoing programming modules may be configured with software, firmware, hardware, or combinations of at least two or more thereof.

The kernel 131 may control or manage system resources (for example, the bus 110, the processor 120, the memory 130, or the like) used to perform an operation or function implemented in the other programming modules, for example, the middleware 132, the API 133, or the application 134. Further, the kernel 131 may provide an interface that allows the middleware 132, the API 133, or the application 134 to access and control or manage an individual component of the electronic device 101.

The middleware 132 may serve as a relay so that the API 133 or the application 134 communicates with the kernel 131 to exchange data. Further, the middleware 132 may perform the control (for example, scheduling or load balancing) of a request for an operation, for example, using a method of assigning at least one application of the application 134 a priority for using a system resource (for example, the bus 110, the processor 120, the memory 130, or the like) of the electronic device 101 with respect to requests for operations received from the application 134.

The API 133 is an interface for the application 134 to control a function provided from the kernel 131 or the middleware 132 and may include, for example, at least one interface or function (for example, a command) for file control, window control, image processing, or text control.

According to various embodiments, the application 134 may include an SMS/MMS application, an email application, a calendar application, an alarm application, a health care application (for example, an application for measuring exercising or blood sugar), an environmental data application (for example, an application for providing atmospheric pressure, humidity, or temperature data), or the like. Additionally or alternatively, the application 134 may be an application relating to information exchanges between the electronic device 101 and an external electronic device (for example, an electronic device 104). The application relating to the information exchanges may include, for example, a notification relay application for relaying specific information to the external electronic device or a device management application for managing the external electronic device.

For example, the notification relay application may include a function of relaying notification information, which is generated in another application (for example, the SMS/MMS application, the email application, the health care application, the environmental data application, or the like) of the electronic device 101, to the external electronic device (for example, the electronic device 104). Additionally or alternatively, the notification relay application may receive notification information, for example, from the external electronic device (for example, the electronic device 104) and provides the notification information to a user. The device management application may manage (for example, install, delete, or update), for example, a function (for example, a function of turning on/turning off the external electronic device itself (or some components) or adjusting the brightness (or resolution) of a display) for at least some components of the external electronic device (for example, the electronic device 104) communicating with the electronic device 101, an application operating in the external electronic device, or a service (for example, a call service or message service) provided by the external electronic device.

According to various embodiments, the application 134 may include an application assigned according to an attribute (for example, an electronic device type) of the external electronic device (for example, the electronic device 104). For example, when the external electronic device is an MP3 player, the application 134 may include an application relating to music playback. Similarly, when the external electronic device is a mobile medical device, the application 134 may include an application relating to health care. According to one embodiment, the application 134 may include at least one of an application assigned to the electronic device 101 and an application received from the external electronic device (for example, a server 106 or the electronic device 104).

The input/output interface 140 may transmit a command or data, which is input from a user through an input/output device (for example, a sensor, a keyboard, or a touch screen), to the processor 120, the memory 130, the communication interface 160, or the image processing module 170, for example, through the bus 110. For example, the input/output interface 140 may provide, to the processor 120, data on a touch input by the user through the touch screen. Further, the input/output interface 140 may output, through the input/output device (for example, a speaker or display), a command or data that is received from the processor 120, the memory 130, the communication interface 160, or the image processing module 170, for example, through the bus 110. For example, the input/output interface 140 may output sound data, which is processed by the processor 120, to the user through the speaker.

The display 150 may display various kinds of information (for example, multimedia data, text data, or the like) for the user.

The communication interface 160 may connect communication between the electronic device 101 and an external device (for example, the electronic device 104 or server 106). For example, the communication interface 160 may be connected to a network 162 via wireless communication or wire-based communication to communicate with the external device. The wireless communication may include at least one of, for example, Wireless Fidelity (Wi-Fi), Bluetooth (BT), near field communication (NFC), a global positioning system (GPS), and cellular communication (for example, LTE, LTE-A, CDMA, WCDMA, UMTS, WiBro, GSM, or the like). The wire-based communication may include at least one of, for example, universal serial bus (USB), high definition multimedia interface (HDMI), recommended standard 232 (RS-232), and plain old telephone service (POTS).

According to one embodiment, the network 162 may be a telecommunications network. The telecommunications network may include at least one of a computer network, the Internet, the Internet of things, and a telephone network. According to one embodiment, a protocol for communication between the electronic device 101 and the external device (for example, a transport layer protocol, data link layer protocol or physical layer protocol) may be supported by at least one of the application 134, the API 133, the middleware 132, the kernel 131, and the communication interface 160.

According to various embodiments, the image processing module 170 may include an image sensor capable of capturing a photographed image of a subject. The image sensor may collect an image including a plurality of color pixels and at least one piece of phase difference information.

According to one embodiment, the image processing module 170 may provide a photography parameter to a camera module 180, for example, prior to a photographing command.

According to various embodiments, the image processing module 170 may identify a subject from image data, may calculate a photography parameter corresponding to a focal distance of the identified subject, and may provide the photography parameter for the camera module 180.

The camera module 180 may provide an image captured by photographing the subject for the processor 120. According to various embodiments, the camera module 180 may store the photography parameter provided from the image processing module 170 and may operate a camera based on the stored photography parameter corresponding to a photographing command. Here, the photography parameter may include the position of a moving lens, the number of exposure times of the sensor, exposure time of the sensor, the photoelectric efficiency of the sensor, the brightness of a flash, light emitting time of the flash or the like, and the camera module 180 may control operations of the lens, the flash, and the sensor based on the stored photography parameter according to the photographing command.

Additional information on the image processing module 170 will be provided with reference to FIGS. 2 to 6 illustrated below.

Figure 2:
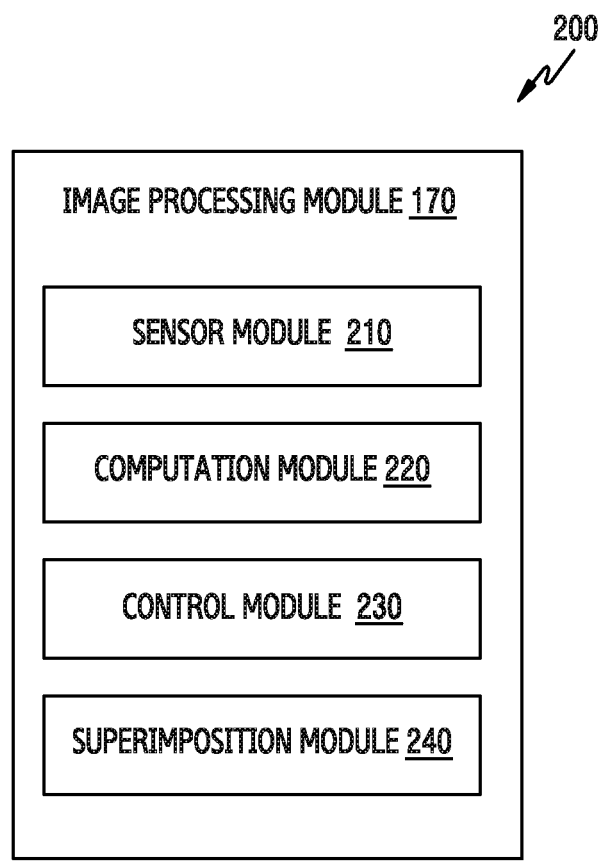
FIG. 2 illustrates a configuration of an image processing module 170 according to various embodiments of the present disclosure.

FIG. 2 is a block diagram 200 of an image processing module 170 of an electronic device (for example, the electronic device 101) according to various embodiments of the present disclosure.

Referring to FIG. 2, the image processing module 170 may be configured to include a sensor module 210, a computation module 220, a control module 230, and a superimposition module 240.

The sensor module 210 may collect information that may be used to identify a subject from image data. According to various embodiments, the sensor module 210 may acquire phase difference information. For example, the sensor module 210 may collect phase difference information including information relating to a distance between a camera module (for example, the camera module 180 of the electronic device) and the subject and reliability of the information.

The computation module 220 may identify a subject from image data and may calculate a photography parameter corresponding to a focal distance of the identified subject. According to various embodiments, the computation module 220 may identify the subject based on the phase difference information collected by the sensor module 210. According to various embodiments, the computation module 220 may analyze the image data to recognize, for example, a body part, thereby identifying the subject.

According to various embodiments, the image data may be an image captured at a current position without moving a lens or an image captured with the lens moving corresponding to the focal distance of the subject selected by the user. The image data may be an image captured at random prior to a photographing command.

According to various embodiments, the computation module 220 may compare the image data, which is acquired by the foregoing method, with the phase difference information to identify the subject based on a block in a first area having a continuously similar phase difference. For example, when the color, texture, or contrast of the block is similar to the phase difference information, the computation module 220 may recognize the block as the subject.

According to various embodiments, the computation module 220 may calculate the number of shots taken, a photographing order, and a photography parameter corresponding to the number of shots taken based on the identified subject. For example, the computation module 220 may calculate photography parameters (photography parameters for three positions) for three subjects with respect to image data including the three subjects photographed at the current position of the lens. In another example, the computation module 220 may calculate photography parameters (photography parameters for two positions) for subjects that are out of focus with respect to image data including three subjects photographed at a position corresponding to a focal distance of a subject selected by the user.

According to various embodiments, the photography parameter may include the position of a moving lens, the number of exposure times of a sensor, exposure time of the sensor, the photoelectric efficiency of the sensor, the brightness of a flash, light emitting time of the flash, or the like. According to one embodiment, the photography parameter may be the position of a moving lens, the number of exposure times of a sensor, exposure time of the sensor, the photoelectric efficiency of the sensor, the brightness of a flash, light emitting time of the flash, or the like for focusing on each subject.

According to one embodiment, the computation module 220 may calculate the position of the lens corresponding to the focal distance of the identified subject (multiple subjects) and may process the calculated position information on the lens, the number of shots taken, and information on the photographing order to be provided to the camera module prior to a photographing command.

According to one embodiment, the computation module 220 may calculate the brightness of the flash corresponding to the focal distance of the identified subject (multiple subjects) and may process the calculated brightness information on the flash, the number of shots taken, and information on the photographing order to be provided to the camera module prior to a photographing command. For example, when the focal distance of the subject is shorter than a predetermined distance, the computation module 220 may lower the brightness of the flash to photograph the subject.

According to one embodiment, the computation module 220 may calculate exposure (exposure time or photoelectric efficiency) of a sensor (multiple sensors) corresponding to the focal distance of the identified subject (multiple subjects) and the brightness of the flash, and may process the calculated exposure information, the number of shots taken, information on the photographing order, and lens position information to be provided to the camera module prior to a photographing command.

The control module 230 may control the sensor module 210 and the computation module 230 to provide a photography parameter to the camera module prior to a photographing command. For example, the control module 230 may provide the information collected by the sensor module 210, for example, the phase difference information, to the computation module 220 and may provide the photography parameter calculated by the computation module 220 to the camera module.

The superimposition module 240 may apply an effect to an image captured by the camera module. According to various embodiments, the superimposition module 240 may distinguish a subject from a background using the subject included in a plurality of images and may apply a blur effect to the background. According to various embodiments, the superimposition module 240 may compose a plurality of images consecutively captured to generate an image focusing on a plurality of subjects.

Figure 3:
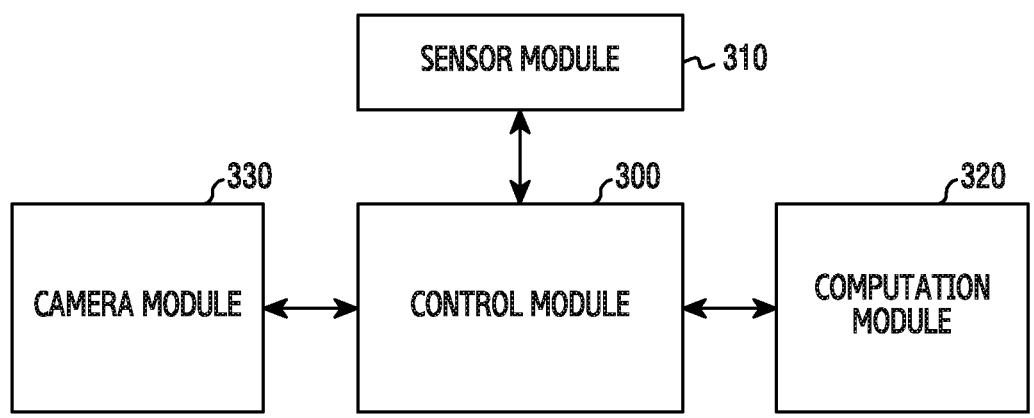
FIG. 3 illustrates a configuration of an electronic device according to various embodiments of the present disclosure.

FIG. 3 illustrates a configuration of an electronic device according to various embodiments of the present disclosure. In the description of FIG. 3, parts that are the same as, or similar to, those in FIG. 2 are omitted.

According to various embodiments, the electronic device may be configured to include a control module 300, a sensor module 310, a computation module 320, and a camera module 330.

According to various embodiments, the sensor module 310 may acquire phase difference information including information relating to a distance between the camera module 330 and a subject and reliability of the information. Here, the reliability may include information relating to accumulated reliability (for example, reliabilities of previous frames) and may represent the reliability of the phase difference information.

The control module 300 may acquire the phase difference information through the sensor module 310 and may provide the phase difference information to the computation module 320.

The computation module 320 may identify a subject from image data based on the phase difference information provided from the control module 300 and may calculate a photography parameter corresponding to a focal distance of the identified subject. The image data may be image data focusing on a subject selected by a user input, image data output on a preview screen, or the like. According to various embodiments, the computation module 320 may provide the calculated photography parameter to the control module 300.

The control module 300 may provide the photography parameter, which is calculated by the computation module 320, to the camera module 330 prior to a photographing command from the user. According to one embodiment, the control module 300 may perform an operation of detecting a photographing command in a state where the photography parameter is provided to the camera module 330. According to another example, when the control module 300 detects a photographing command before providing the photography parameter to the camera module 330, the control module 300 may delay providing the photographing command to the camera module 330 and then may preferentially provide the photography parameter to the camera module 330.

The camera module 330 may store the photography parameter and may operate a camera based on the stored photography parameter after the photographing command to capture an image corresponding to each position.

For example, when position information on a lens corresponding to the focal distance of the subject is used as a photography parameter, the camera module 330 may move the lens to each position corresponding to the subject based on the stored position information and may capture an image corresponding to each position.

According to one embodiment, when flash brightness information corresponding to the focal distance of the subject is used as a photography parameter, the camera module 330 allows a flash to emit light based on stored brightness information and may capture an image corresponding to each position.

According to one embodiment, when the exposure of a sensor corresponding to the focal distance of the subject and brightness are used as photography parameters, the camera module 330 may operate the sensor based on stored exposure information to capture an image corresponding to each position.

Figure 4:
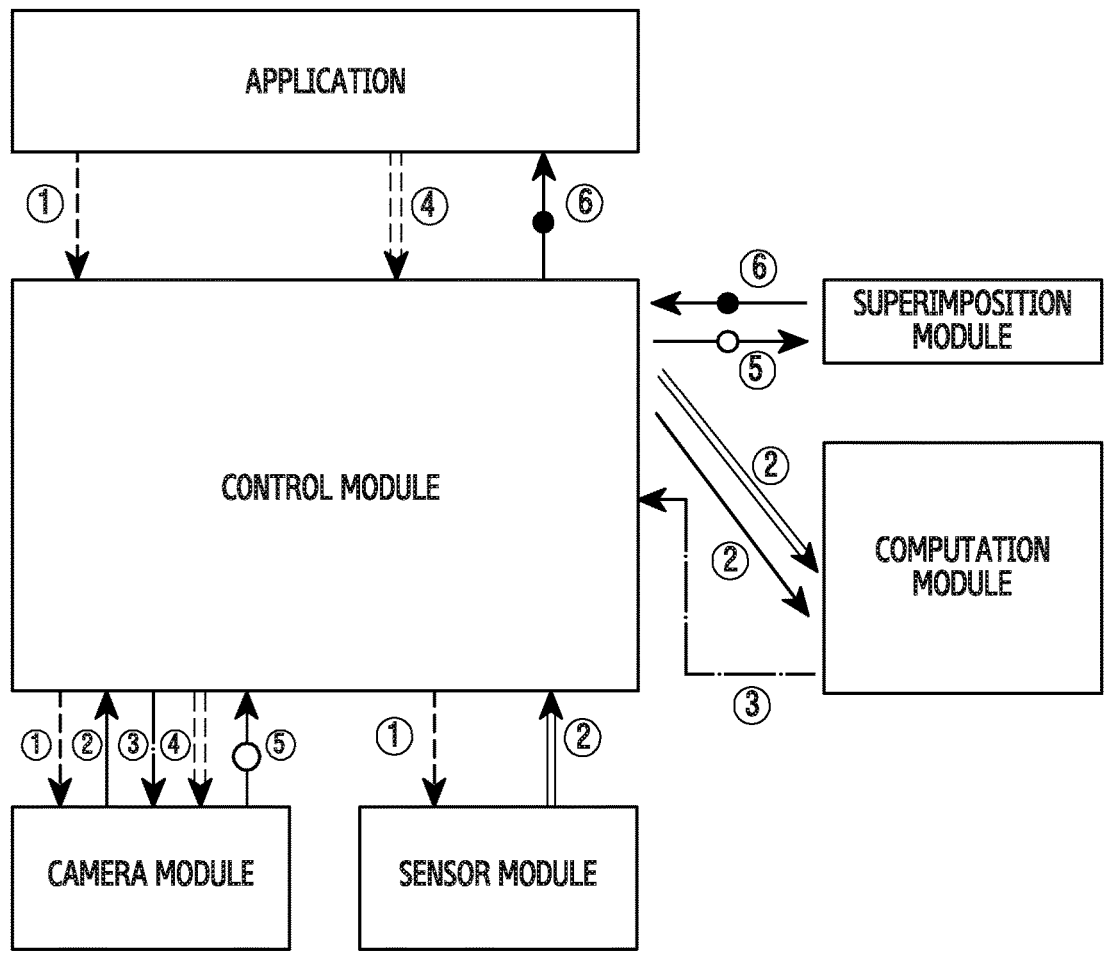
FIG. 4 illustrates a configuration of a software module according to various embodiments of the present disclosure.

FIG. 4 illustrates a configuration of a software module according to various embodiments of the present disclosure.

According to various embodiments, the software module may include a control module, a superimposition module, and a computation module.

According to various embodiments, the software module may include an application that may correspond to the highest layer. The application may include an application that provides an image capturing function. For example, the application may include an application that provides an out-of-focus photography function using focus bracketing.

The control module may include a framework and a hardware abstraction layer (HAL). The control module may include a plurality of modules configured in advance to provide an operating system (OS), for example, a function commonly necessary by the applications.

The superimposition module may be a program frequently used by the control module. For example, the superimposition module may include a program for applying an effect to a captured image or the like.

According to various embodiments, the control module may serve to connect an operating system, for example, the Android operating system, with hardware, for example, a sensor module, a camera module, or the like.

According to various embodiments, when it is ready to acquire an image (for example, when an image acquisition screen is output according to a command $\hat{1}$ from an application), the control module may acquire a first image $\hat{2}$ including a subject in focus through a camera module and may acquire phase difference information through a sensor module. Here, the phase difference information may include information representing a distance between the camera module and the subject, reliability of the information, and information on the state of the sensor module. The state of the sensor module may be information on accumulated reliability.

According to various embodiments, the control module may provide the phase difference information and the first image to the computation module so that the number of shots taken, a photography parameter, and the like are calculated.

The computation module may identify the subject based on the first image and the phase difference information, may calculate a photography parameter corresponding to a focal distance of the identified subject and the number of shots taken $\hat{3}$ with respect to the subject, and may provide the photography parameter and the number of shots taken to the control module.

The control module may provide the photography parameter calculated by the computation module to the camera module, and the camera module may control an operation of a camera based on the photography parameter after a photographing command $\hat{4}$ to acquire an image (second image) $\hat{5}$.

The control module may provide the acquired image to the superimposition module in order to acquire an effect-applied image. According to one embodiment, the superimposition module may apply an effect to output an effect-applied image ($3^{rd}$ image) $\hat{6}$ through the application, for example, to distinguish the subject from a background in the image.

An electronic device, according to various embodiments, may include: a sensor module configured to acquire phase difference information and to relay the phase difference information to a control module; the control module configured to relay the acquired phase difference information to a computation module or to relay a photography parameter to a camera module; the computation module configured to perform at least one or more of operations of identifying a subject from image data on the basis of the phase difference information, calculating a photography parameter for the subject, and relaying the photography parameter to the control module; and the camera module configured to store the photography parameter provided from the control module, wherein the photography parameter may be relayed to the camera module prior to a photographing command from a user, and the camera module may operate a camera on the basis of the photography parameter after the photographing command to capture an image corresponding to each position.

According to various embodiments, the sensor module may collect, as the phase difference information, one or more of information on a distance between the camera module and the subject and reliability information on the information on the distance.

According to various embodiments, the computation module may compare the phase difference information with the image data and may identify, as the subject, a block of the image data including a phase difference satisfying a condition.

According to various embodiments, the computation module may identify, as the subject, a block of the image data including a phase difference satisfying a condition on the basis of at least one or more of a color, a texture, and a contrast.

According to various embodiments, the camera module acquires the image data by moving a lens to focus on a subject selected by an input and provides the image data to the computation module.

According to various embodiments, the camera module may photograph the subject after the photographing command and may then capture an image by moving a lens on the basis of the photography parameter.

According to various embodiments, the computation module may calculate, as the photography parameter corresponding to a focal distance of the subject, one or more of at least two different positions of a lens moving, number of exposure times of a sensor, exposure time of the sensor, photoelectric efficiency of the sensor, brightness of a flash, and light emitting time of the flash.

Figure 5:
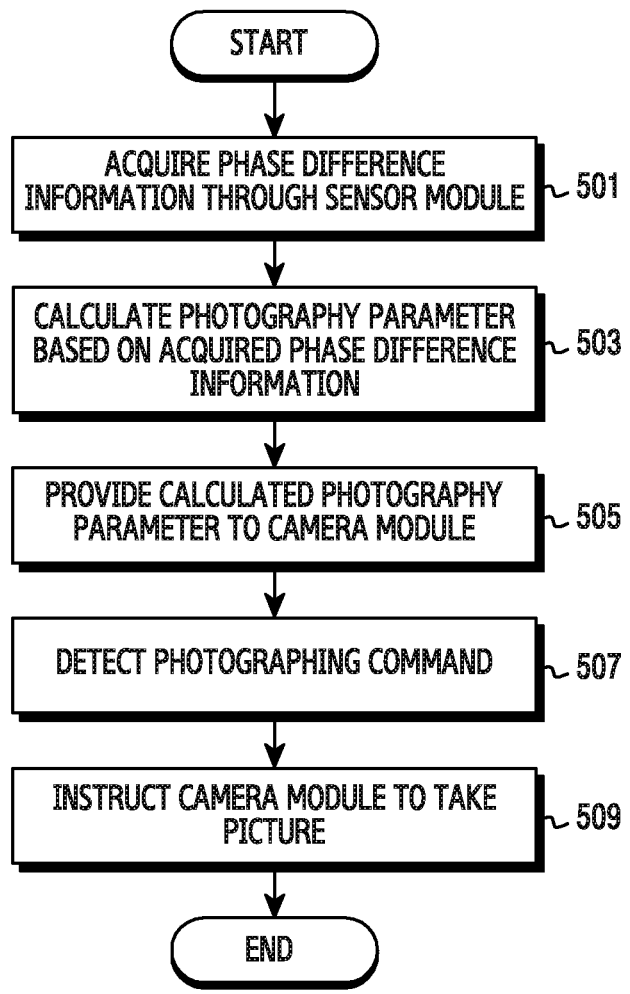
FIG. 5 is a flowchart illustrating operations of an electronic device according to various embodiments of the present disclosure.

FIG. 5 is a flowchart illustrating operations of an electronic device according to various embodiments of the present disclosure.

In operation 501, the electronic device may acquire phase difference information through a sensor module.

In operation 503, the electronic device may calculate a photography parameter based on the acquired phase difference information. According to various embodiments, the electronic device may identify a subject from image data based on the phase difference information and may calculate a photography parameter corresponding to a focal distance of the identified subject.

For example, when a subject is selected by a user input in a state where the electronic device is in a photographing mode, the electronic device may move a lens up to a first position based on the phase difference information and may compare an image corresponding to the first position with the phase difference information to calculate the number of shots taken and a photography parameter.

In operation 505, the electronic device may provide the calculated photography parameter to the camera module.

In operation 507, the electronic device may detect a photographing command. According to various embodiments, the electronic device may calculate the photography parameter and may provide the photography parameter to the camera module prior to the occurrence of a photographing command by the user. According to various embodiments, the electronic device may also provide information on the number of shots taken, along with the photography parameter, to the camera module.

In operation 509, the electronic device may instruct the camera module to take a picture. According to various embodiments, the camera module of the electronic device may operate a camera based on the photography parameter according to a given photographing command. For example, the camera module may capture an image while controlling the position of the lens, the brightness of a flash, an exposure sensor, or the like based on the photography parameter.

According to various embodiments, an image processing method of an electronic device may include an operation of acquiring phase difference information prior to image capturing, an operation of identifying a subject from image data based on the acquired phase difference information, an operation of calculating the brightness of a flash (multiple flashes) corresponding to a focal distance of the identified subject (multiple subjects), an operation of relaying in advance a calculated brightness value of the flash to a camera module, and an operation of capturing an image corresponding to each position by allowing the flash to emit light based on the calculated brightness in image capturing.

According to various embodiments, an image processing method of an electronic device may include an operation of acquiring phase difference information prior to image capturing, an operation of identifying a subject from image data based on the acquired phase difference information, an operation of calculating the exposure (exposure time or photoelectric efficiency) of a sensor (multiple sensors) corresponding to a focal distance of the identified subject (multiple subjects) and the brightness of a flash, an operation of relaying in advance a calculated exposure value of the sensor to the camera module, and an operation of capturing an image corresponding to each position by operating the sensor based on the calculated exposure value of the sensor in image capturing.

Figure 6:
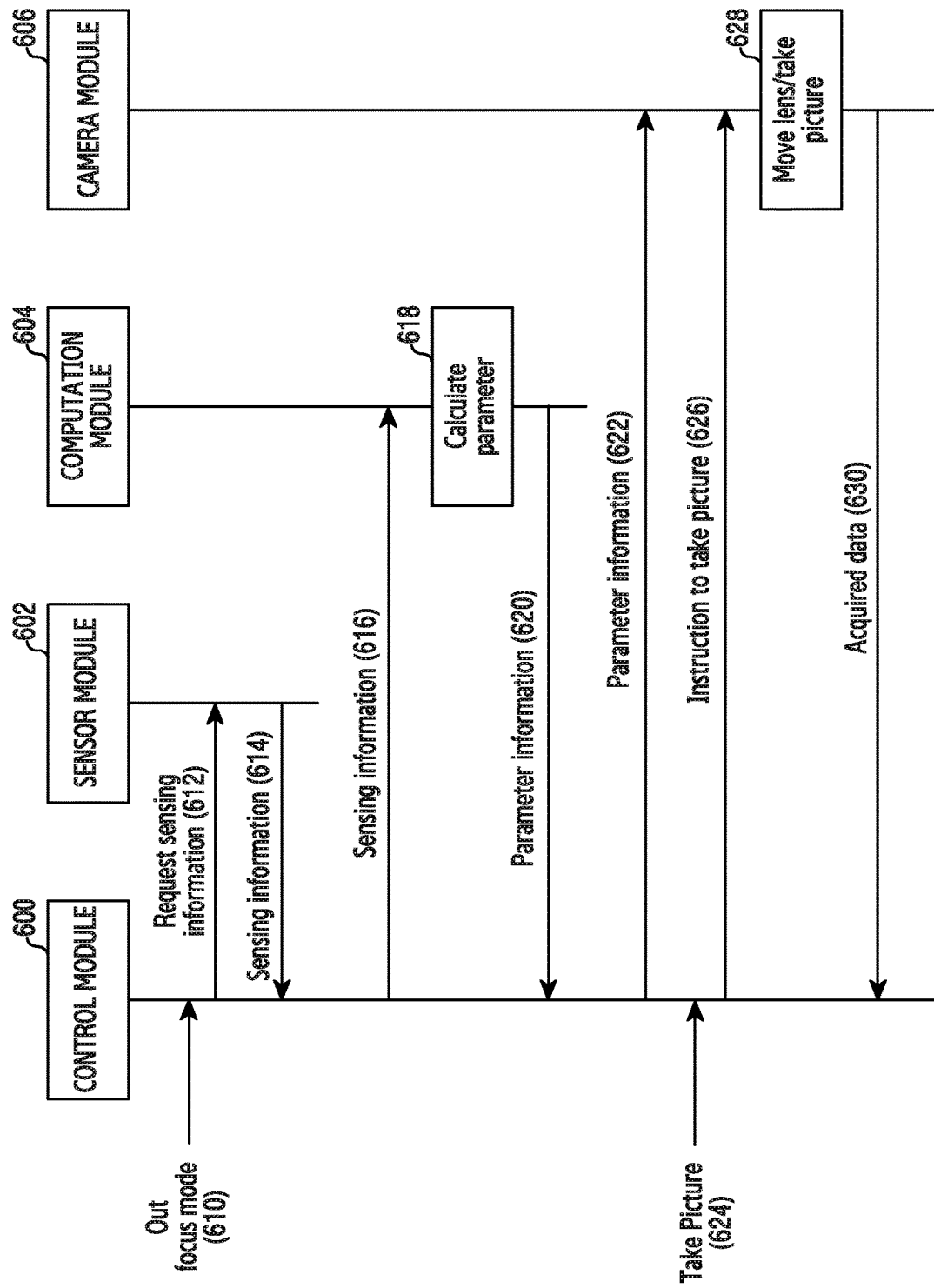
FIG. 6 is a diagram illustrating operations of an electronic device according to various embodiments of the present disclosure.

FIG. 6 is a diagram illustrating operations of an electronic device according to various embodiments of the present disclosure.

According to various embodiments, the electronic device may be configured to include a control module 600, a sensor module 602, a computation module 604, and a camera module 606.

According to various embodiments, when it is ready to acquire an image (for example, when an image acquisition screen is output or an out-of-focus mode is selected) 610, the control module 600 may request 612 sensing information from the sensor module 602, and the sensor module 602 may provide 614 sensing information to the control module 600 in response to the request. According to various embodiments, the sensor module 602 may collect phase difference information including information relating to a distance between the camera module 606 and a subject, the reliability of the information, or the like.

The control module 600 may provide 616 the sensing information collected by the sensor module 602, for example, the phase difference information, to the computation module 604.

According to various embodiments, the computation module 604 may calculate 618 a photography parameter based on the phase difference information. According to various embodiments, the computation module 604 may identify a subject from image data based on the phase difference information and may calculate a photography parameter corresponding to a focal distance of the identified subject. The photography parameter may be the position of a lens, the brightness of a flash, exposure control information, or the like.

According to various embodiments, the computation module 604 may provide 620 calculated parameter information to the control module 600, and the control module 600 may provide 622 the parameter information to the camera module 606.

According to various embodiments, when the control module 600 detects 624 a photographing command, the control module 600 instructs 626 the camera module 606 to take a picture, and the camera module 606 may move the lens of a camera based on the photography parameter according to the photographing command and may acquire 628 an image corresponding to the moved position.

According to various embodiments, the camera module 606 may provide 630 the acquired image to the control module 600.

Operations of an electronic device, according to various embodiments, may include an operation of controlling a computation module to identify a subject from image data and calculating a photography parameter on the basis of the identified subject; and an operation of providing the calculated photography parameter to a camera module through a control module prior to a photographing command from a user.

According to various embodiments, the operation of calculating the photography parameter may include an operation of providing phase difference information collected through a sensor module to the computation module.

According to various embodiments, the phase difference information collected through the sensor module may include one or more of information on a distance between the camera module and the subject and reliability information on the information on the distance.

According to various embodiments, the operation of calculating the photography parameter may include an operation of calculating one or more of at least two different positions of a lens moving, the number of exposure times of a sensor, the exposure time of the sensor, the photoelectric efficiency of the sensor, the brightness of a flash, and the light emitting time of the flash.

According to various embodiments, the operations of the electronic device may include an operation of controlling the camera module to control an operation of a camera on the basis of the photography parameter after the photographing command.

According to various embodiments, the operation of calculating the photography parameter may further include an operation of determining number of shots taken corresponding to a plurality of focal distances on the basis of the identified subject.

Figure 7:
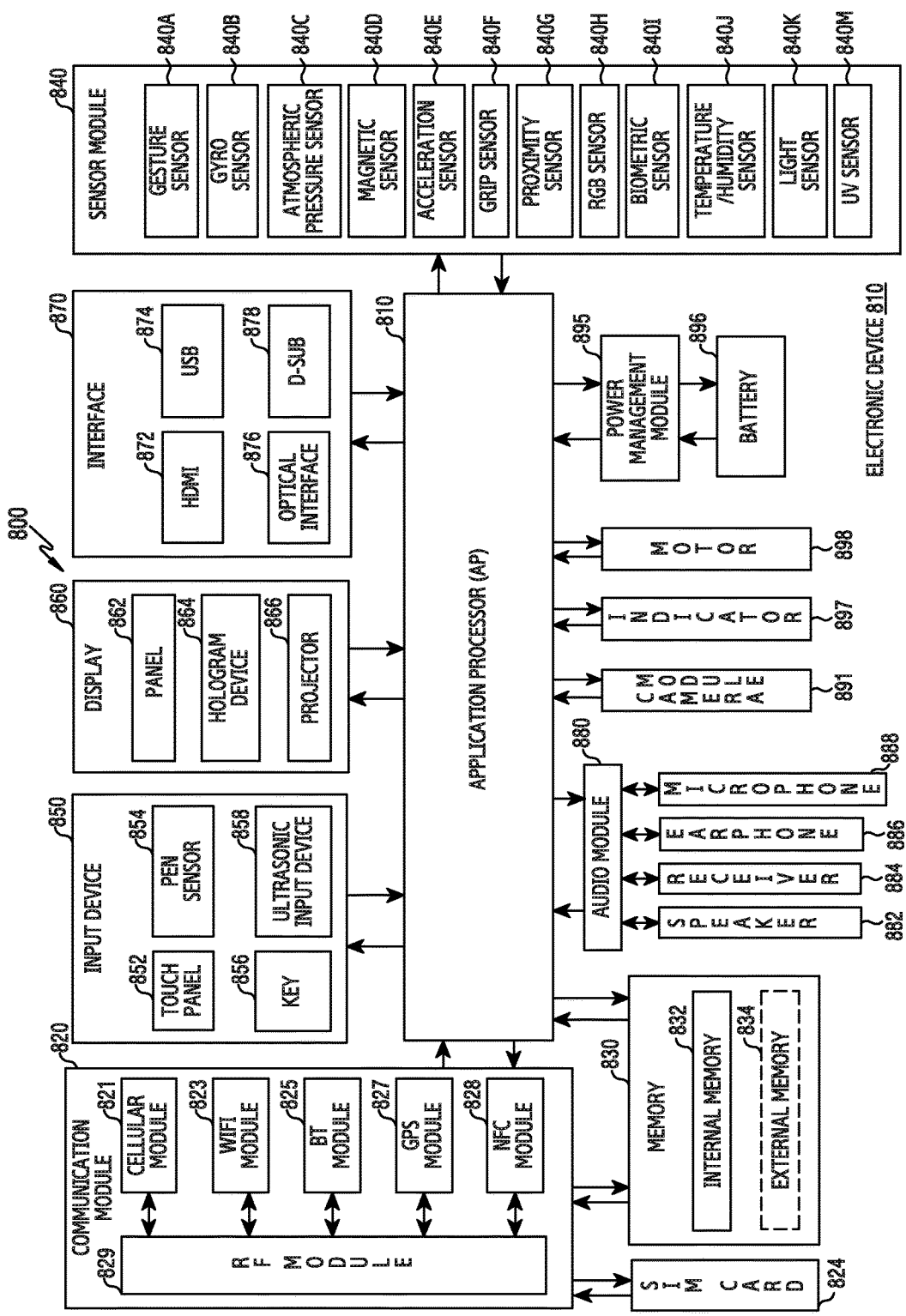
FIG. 7 illustrates a block diagram 800 of an electronic device 801 according to various embodiments of the present disclosure.

FIG. 7 illustrates a block diagram 800 of an electronic device 801 according to various embodiments of the present disclosure. The electronic device 801 may form, for example, the whole or part of the electronic device 101 illustrated in FIG. 1. Referring to FIG. 7, the electronic device 801 may include one or more application processors (APs) 810, a communication module 820, a subscriber identification module (SIM) card 824, a memory 830, a sensor module 840, an input device 850, a display 860, an interface 870, an audio module 880, a camera module 891, a power management module 895, a battery 896, an indicator 897, and a motor 898.

The APs 810 may run an operating system or an application program to control a plurality of hardware or software components that are connected to the APs 810 and may perform processing of various kinds of data including multimedia data and operations. The APs 810 may be configured, for example, as a system on chip (SoC). According to one embodiment, the APs 810 may further include a graphic processing unit (GPU, not shown).

The communication module 820 (for example, the communication interface 160) may transmit and receive data in communications between the electronic device 801 (for example, the electronic device 101) and other electronic devices (for example, the electronic device 104 or the server 106) connected through a network. According to one embodiment, the communication module 820 may include a cellular module 821, a Wi-Fi module 823, a BT module 825, a GPS module 827, an NFC module 828, and a radio frequency (RF) module 829.

The cellular module 821 may provide a voice call, a video call, a text messaging service, or an Internet service through a communication network (for example, LTE, LTE-A, CDMA, WCDMA, UMTS, WiBro, GSM, or the like). Further, the cellular module 821 may perform identification and authentication of an electronic device in a communication network, for example, using an SIM (for example, the SIM card 824). According to one embodiment, the cellular module 821 may perform at least part of the functions provided by the APs 810. For example, the cellular module 821 may perform at least part of a multimedia control function.

According to one embodiment, the cellular module 821 may include a communication processor (CP). Further, the cellular module 821 may be configured, for example, as an SoC. FIG. 7 shows that components, such as the cellular module 821 (for example, the CP), the memory 830, or the power management module 895, are separate components from the APs 810. According to one embodiment, however, the APs 810 may be configured to include at least part (for example, the cellular module 821) of the foregoing components.

According to one embodiment, the APs 810 or the cellular module 821 (for example, the CP) may load a command or data, which is received from a nonvolatile memory connected to each of the APs 810 or the cellular module 821, or from at least one of other components, into a volatile memory to process the command or data. The APs 810 or the cellular module 821 may store data, which is received from or generated by at least one of other components, in the nonvolatile memory.

The Wi-Fi module 823, the BT module 825, the GPS module 827, and the NFC module 828 may each include a processor to process data that is transmitted and received, for example, via the respective modules. In FIG. 7, the cellular module 821, the Wi-Fi module 823, the BT module 825, the GPS module 827, and the NFC module 828 are shown in separate blocks, respectively. According to one embodiment, however, at least part (for example, two or more) of the cellular module 821, the Wi-Fi module 823, the BT module 825, the GPS module 827, and the NFC module 828 may be included in one integrated chip (IC) or IC package. For example, at least part (for example, the CP corresponding to the cellular module 821 and a Wi-Fi processor corresponding to the Wi-Fi module 823) of processors respectively corresponding to the cellular module 821, the Wi-Fi module 823, the BT module 825, the GPS module 827, and the NFC module 828 may be configured as one SoC.

The RF module 829 may transmit and receive data, for example, an RF signal. The RF module 829 may include, for example, although not shown, a transceiver, a power amplifier module (PAM), a frequency filter, a low noise amplifier (LNA), or the like. Further, the RF module 829 may further include a component for transmitting and receiving electromagnetic waves in the free space in wireless communication, for example, a conductor, a conducting wire, or the like. FIG. 7 shows that the cellular module 821, the Wi-Fi module 823, the BT module 825, the GPS module 827, and the NFC module 828 share one RF module 829. According to one embodiment, however, at least one of the cellular module 821, the Wi-Fi module 823, the BT module 825, the GPS module 827, and the NFC module 828 may transmit and receive an RF signal through a separate RF module.

The SIM card 824 may be a card including an SIM and may be inserted into a slot formed at a specific position of the electronic device. The SIM card 824 may include unique identification information (for example, an integrated circuit card identifier (ICCID)) or subscriber information (for example, an international mobile subscriber identity (IMSI)).

The memory 830 (for example, the memory 130) may include an internal memory 832 or an external memory 834. The internal memory 832 may include, for example, at least one of a volatile memory (for example, a dynamic random-access memory (DRAM), a static RAM (SRAM), a synchronous dynamic RAM (SDRAM), or the like) and a nonvolatile memory (for example, a one-time programmable read-only memory (OTPROM), a programmable ROM (PROM), an erasable and programmable ROM (EPROM), an electrically erasable and a programmable ROM (EEPROM), a mask ROM, a flash ROM, an NAND flash, an NOR flash, or the like).

According to one embodiment, the internal memory 832 may be a solid state drive (SSD). The external memory 834 may further include a flash drive, for example, a compact flash (CF), a secure digital (SD), a micro secure digital (micro-SD), a mini secure digital (mini-SD), an extreme digital (xD), a memory stick, or the like. The external memory 834 may be functionally connected to the electronic device 801 through various interfaces. According to one embodiment, the electronic device 801 may further include a storage device (or storage medium), such as a hard drive.

The sensor module 840 may measure physical quantities or detect an operation state of the electronic device 801 and convert measured or detected information into an electrical signal. The sensor module 840 may include, for example, at least one of a gesture sensor 840A, a gyro sensor 840B, a barometric pressure sensor 840C, a magnetic sensor 840D, an accelerometer 840E, a grip sensor 840F, a proximity sensor 840G, a color sensor 840H (for example, a red, green, and blue (RGB) sensor), a biometric sensor 840I, a temperature/humidity sensor 840J, an illumination sensor 840K, and an ultraviolet (UV) sensor 840M. Additionally or alternatively, the sensor module 840 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), a fingerprint sensor (not shown), or the like. The sensor module 840 may further include a control circuit to control at least one or more sensors belonging thereto.

The input device 850 may include a touch panel 852, a (digital) pen sensor 854, a key 856, or an ultrasonic input device 858. The touch panel 852 may recognize a touch input, for example using at least one of an electrostatic type, a pressure-sensitive type, an infrared type, and an ultrasonic type. Further, the touch panel 852 may further include a control circuit. When the touch panel 852 is an electrostatic type, a physical contact or proximity recognition is possible. The touch panel 852 may further include a tactile layer. In this case, the touch panel 852 may provide a user with a tactile response.

The (digital) pen sensor 854 may be implemented, for example, by a method that is the same as, or similar to, receiving a touch input from a user or using a separate recognition sheet. The key 856 may include, for example, a physical button, an optical key, or a keypad. The ultrasonic device 858 is a device that detects sound waves generated through an input tool, which generates an ultrasonic signal, using a microphone (for example, a microphone 888) of the electronic device 801 and identifies data and may achieve radio recognition. According to one embodiment, the electronic device 801 may receive a user input from an external device connected thereto (for example, a computer or server) using the communication module 820.

The display 860 (for example, the display 150) may include a panel 862, a hologram device 864, or a projector 866. The panel 862 may be, for example, a liquid crystal display (LCD), an active-matrix organic light-emitting diode (AM-OLED), or the like. The panel 862 may be configured, for example, to be flexible, transparent, or wearable. The panel 862 may be formed with the touch panel 852 in a single module. The hologram device 864 may display a three-dimensional image in the air using the interference of light. The projector 866 may project light onto a screen to display an image. The screen may be disposed, for example, inside or outside the electronic device 801. According to one embodiment, the display 860 may further include a control circuit to control the panel 862, the hologram device 864, or the projector 866.

The interface 870 may include, for example, a high-definition multimedia interface (HDMI) 872, a universal serial bus (USB) 874, an optical interface 876, or a D-sub-miniature (D-sub) 878. The interface 870 may be included, for example, in the communication interface 160 illustrated in FIG. 1. Additionally or alternatively, the interface 870 may include, for example, a mobile high-definition link (MHL) interface, an SD card/MMC interface, or an Infrared Data Association (IrDA) interface.

The audio module 880 may convert a sound and an electrical signal reciprocally. At least some components of the audio module 880 may be included, for example, in the input/output interface 140 illustrated in FIG. 1. The audio module 880 may process sound information input or output, for example, through a speaker 882, a receiver 884, earphones 886, or the microphone 888.

The camera module 891 is a device that takes a still image and a video. According to one embodiment, the camera module 891 may include one or more image sensors (for example, a front sensor or a rear sensor), a lens, an image signal processor (ISP, not shown), or a flash (for example, an LED, a xenon lamp, or the like, not shown).

The power management module 895 may manage the power of the electronic device 801. Although not shown, the power management module 895 may include, for example, a power management integrated circuit (PMIC), a charger integrated circuit (IC), or a battery or fuel gauge.

The PMIC may be mounted, for example, in an IC or SoC semiconductor. Charging methods may be divided into cable and wireless charging methods. The charger IC may charge a battery and may prevent overvoltage or overcurrent flow from a charger. According to one embodiment, the charger IC may include a charger IC for at least one of a cable charging method and a wireless charging method. The wireless charging method may include, for example, a magnetic resonance method, a magnetic induction method, or an electromagnetic wave method, and an additional circuit for wireless charging, such as a coil loop, a resonance circuit, or a rectifier, may be added.

The battery gauge may measure, for example, the remaining battery charge, the charging voltage, the current, or the temperature of the battery 896. The battery 896 may store or generate electricity and may supply power to the electronic device 801 using the stored or generated electricity. The battery 896 may include, for example, a rechargeable battery or a solar battery.

The indicator 897 may display a specific state of the electronic device 801 or a component thereof (for example, the APs 810), for example, a booting state, a message state, or a charging state. The motor 898 may convert an electrical signal into mechanical vibrations. Although not shown, the electronic device 801 may include a processing device for supporting a mobile TV (for example, a GPU). The processing device for supporting the mobile TV may process media data in accordance with digital multimedia broadcasting (DMB), digital video broadcasting (DVB), or MediaFlo standards.

Each of the components of the electronic device according to the present disclosure may be implemented by one or more components and the name of the corresponding component may vary depending on a type of the electronic device. The electronic device according to the present disclosure may be configured by including at least one of the above-described elements, and some of the elements may be omitted, or other elements may be added. Further, some of the elements of the electronic device according to the present disclosure may be combined to be one entity, which can perform the same functions as those of the elements before the combination.

The term "module" used in the present disclosure may refer to, for example, a unit including one or more combinations of hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 210), the one or more processors may execute a function corresponding to the command. The computer-readable storage medium may be, for example, the memory 220. At least a part of the programming module may, for example, be implemented (e.g., executed) by the processor 210. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a storage medium stores commands, wherein the commands are set for at least one processor to perform at least one operation when executed by the at least one processor, and the at least one operation may include an operation of controlling a sensor module to acquire phase difference information; an operation of controlling a computation module to identify a subject from image data on the basis of the phase difference information or to calculate a photography parameter for the subject; an operation of relaying the calculated photography parameter to a camera module through the control module prior to a photographing command from a user; and an operation of controlling the camera module to operate a camera on the basis of the photography parameter after the photographing command to capture an image corresponding to each position.

Meanwhile, the exemplary embodiments disclosed in the specification and drawings are merely presented to easily describe the technical contents of the present disclosure and help with the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

The invention claimed is:

1. A method for operating of an electronic device comprising:
   detecting a selection of out-of-focus mode which uses a focus bracketing;
   in response to detecting the selection of out-of-focus mode, acquiring phase difference information based on at least one sensor;
   identifying a plurality of subjects from image data based on the phase difference information;
   determining a photography parameter for each of the plurality of subjects before receiving a photographing command;
   receiving the photographing command based on a user input; and
   operating a camera based on the photography parameter in response to the receiving of the photographing command,
   wherein the photography parameter comprises at least one of a position of a moving lens, number of exposure times of a sensor, exposure time of the sensor, photoelectric efficiency of the sensor, brightness of a flash, and light emitting time of the flash.

2. The method of claim 1,
   wherein the identifying of the plurality of subjects comprises identifying, as the plurality of subjects, a block of the image data comprising a phase difference satisfying a condition on the basis of at least one or more of a color, a texture, and a contrast.

3. The method of claim 2, wherein the acquiring of the phase difference information comprises collecting, as the phase difference information, one or more of information on a distance between the camera and the plurality of subjects, and reliability information on the information on the distance.

4. The method of claim 1, wherein the operating of the camera based on the photography parameter comprises controlling the camera to control an operation of a camera on a basis of the photography parameter, after the detecting of the photographing command.

5. The method of claim 1, wherein determining the photography parameter comprises determining a number of shots taken corresponding to a plurality of focal distances, on a basis of the plurality of subjects.

6. The method of claim 1, wherein the image data comprises at least one of image data focusing on a subject selected by a user input or image data output on a preview screen.

7. An electronic device comprising:
   a camera;
   at least one sensor configured to acquire phase difference information; and
   at least one processor configured to:
   detect a selection of out-of-focus mode which uses a focus bracketing;
   in response to detecting the selection of the out-of-focus mode:

identify a plurality of subjects from image data on a basis of the phase difference information, and determine a photography parameter for each of the plurality of subjects before receiving a photographing command, receive the photographing command based on a user input, and operate the camera on a basis of the photography parameter in response to the receiving of the photographing command, wherein the photography parameter comprises at least one of a position of a moving lens, number of exposure times of a sensor, exposure time of the sensor, photoelectric efficiency of the sensor, brightness of a flash, and light emitting time of the flash.

8. The electronic device of claim 7, wherein the at least one processor is further configured to collect, as the phase difference information, one or more of information on a distance between the camera and the plurality of subjects, and reliability information on the information on the distance.

9. The electronic device of claim 7, wherein the at least one processor is further configured to:

compare the phase difference information with the image data, and identify, as the plurality of subjects, a block of the image data comprising a phase difference satisfying a condition.

10. The electronic device of claim 7, wherein the at least one processor is further configured to identify, as the plurality of subjects, a block of the image data comprising a phase difference satisfying a condition on a basis of at least one or more of a color, a texture, and a contrast.

11. The electronic device of claim 7, wherein the camera is further configured to:

acquire the image data by moving the moving lens to focus on a subject selected by an input among the plurality of subjects, and provide the image data to the at least one processor.

12. The electronic device of claim 7, wherein the at least one processor is further configured to: control the camera to capture an image or the image data by moving the moving lens on a basis of the photography parameter in response to the detecting of the photographing command.

13. A non-transitory computer-readable recording medium comprising a program configured to implement:

detecting a selection of out-of-focus mode which uses a focus bracketing;

in response to detecting the selection of the out-of-focus mode, acquiring phase difference information based on at least one sensor;

identifying a plurality of subjects from image data based on the phase difference information;

determining a photography parameter for each of the plurality of subjects before receiving a photographing command;

receiving the photographing command based on a user input; and operating a camera based on the photography parameter in response to the detecting of the photographing command, wherein the photography parameter comprises at least one of a position of a moving lens, number of exposure times of a sensor, exposure time of the sensor, photoelectric efficiency of the sensor, brightness of a flash, and light emitting time of the flash.

* * * * *